United States Patent Office 3,528,302
Patented Sept. 15, 1970

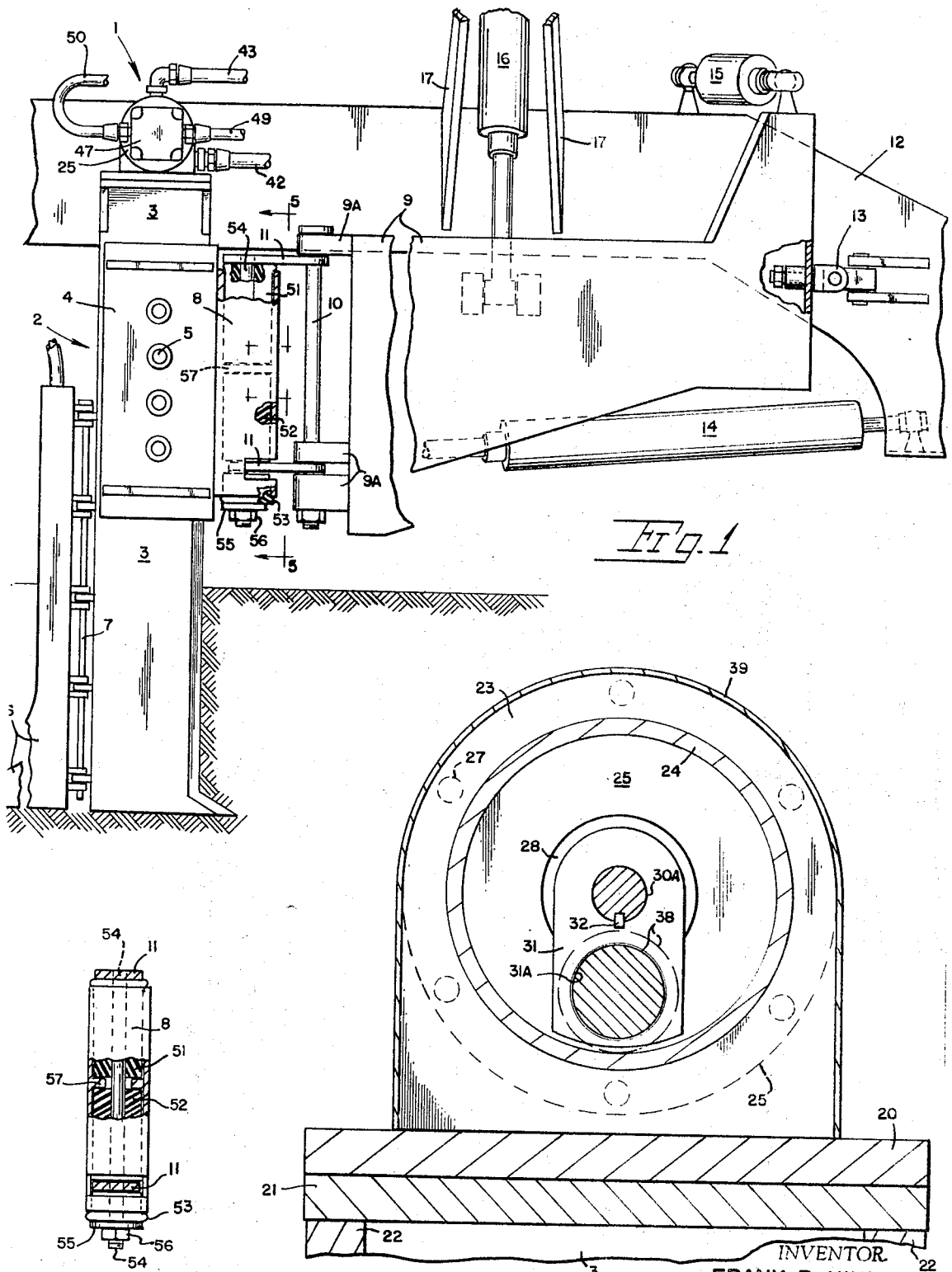

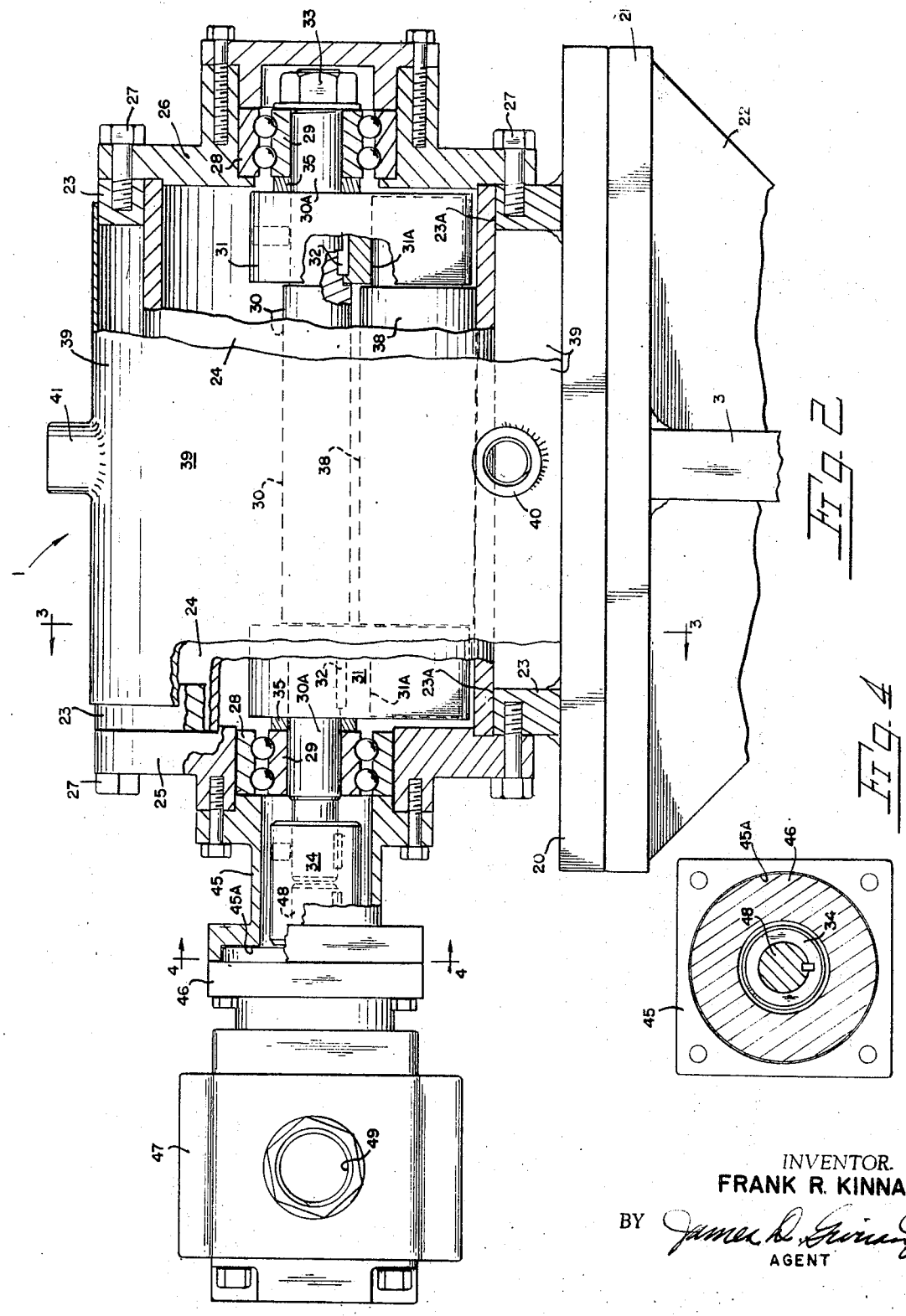

3,528,302
VIBRATORY UNIT FOR CABLE PLOWS
Frank R. Kinnan, Camas Valley, Oreg., assignor to Henkels and McCoy, Inc., Blue Bell, Pa., a corporation of Pennsylvania
Filed Aug. 17, 1967, Ser. No. 661,313
Int. Cl. B06b 3/00
U.S. Cl. 74—87                3 Claims

ABSTRACT OF THE DISCLOSURE

A vibration inducing unit mounted upon an earth penetrating blade of a cable laying apparatus for lessening the resistance of earthen material to blade passage. The vibration unit includes orbiting means operable within a liquid cooled, cylindrical raceway and in driven engagement with a motor to impart centrifugal force against the raceway and ultimately inducing vibratory movement in the blade. Associated in a trailing manner with the blade is a guide for depositing linear material into a kerf formed by the blade for embedding of said material within a layer of granular earthern particles. Resilient mounting means insulate the prime mover vehicle from the vibratory motion of the cable plow apparatus.

BACKGROUND OF THE INVENTION

The present invention is advantageously used in combination with earth working instruments and particularly the type known as cable plows which conventionally include a blade element for horizontal linear travel forming a kerf in the ground for deposit of conduit material of various types. While the application of vibratory motion to relatively small earth cutting blades to lessen ground resistance is common in the art, the instant vibratory unit is adapted for use with the largest of commercially used cable plows where heretofore the considerable mass of the plow prohibited satisfactory vibratory motion. The vibratory unit includes an orbiting member capable of imparting to a supporting ground engaging blade member sufficient power to achieve the desired objectives some of which are hereinafter stated.

In the prior art I am aware of, vibration inducing units have been applied to exert or induce vibratory movement to the blade members of cable plows in a limited way usually by mounting more or less conventional general purpose vibratory units to the blade member. While helpful in reducing the motive force required for horizontal travel of the cable plow blade through the ground such vibratory units were not designed for or capable of imparting the desired vibratory motion to the blade primarily because of the specific requirements of such motion and the mass of the cable plow assembly. Another important advantage of such vibratory motion of a ground engaging blade is a continuous bed of finely granulated earthen particles progressively formed and deposited along the kerf bottom for embedded reception of the conduit material. The embedding of electrical conduit or cable within such a bed of granulated earthen particles, known as fines in the art, protects the cable structurally and dissipates heat resulting from the cable's electrical resistance. A further advantage of the present vibratory unit is derived from higher frequencies of vibratory movement attainable with the instant invention wherein a substantial reduction in motive force required to advance the blade is realized by reason of the fluid state of the boundary layer of earthen material immediately forward of the advancing cable plow blade. The present vibratory unit in combination with a resiliently supported cable plow assembly accomplishes the desired blade movement without transmitting to the prime mover vehicle undesirable vibration. The vibratory unit is of a compact nature mounted entirely on the blade and conveniently driven by a hydraulic powered motor thus permitting the unit to be located at selected distances from a supporting prime mover vehicle.

SUMMARY OF THE INVENTION

The present vibratory unit embodies an orbiting member capable of imparting suitable vibratory motion to a ground penetrating blade member of a cable plow. Significant obstacles in the past to such vibratory movement in large cable laying plows were related to the sizeable mass of the plow and the deleterious effects of such vibration on a prime mover. The orbiting member of the present unit is confined for travel within a liquid cooled cylindrical raceway which bears the tangentially exerted force of the roller. Accordingly, the bearings associated with the unit are for the most part subject to only the rotational driving loads. The adverse vibration effects of the unit are overcome by isolation of the cable plow apparatus from the chassis of a prime mover vehicle by resilient mounting means.

DRAWING DESCRIPTION

With reference to the accompanying drawings:

FIG. 1 shows in side elevation the present vibratory unit operatively disposed in combination with a cable plow assembly, the latter borne by a prime mover vehicle, the chassis of which is shown in a fragmentary manner, FIG. 2 is a front elevational view of the vibratory unit in supported engagement with a fragment of the blade of the cable plow assembly.

FIG. 3 is a vertical, sectional view of the vibratory unit taken approximately along line 3—3 of FIG. 2.

FIG. 4 is a vertical, sectional view of means for mounting a motor in coupled engagement with said vibratory unit, and FIG. 5 is a vertical, sectional view taken along line 5—5 of FIG. 1 showing details of resilient mounting means for a cable plow assembly.

DESCRIPTION OF PREFERRED EMBODIMENTS

With continuing reference to the drawings wherein like reference numerals indicate like parts and particularly FIG. 1 thereof, the reference numeral 1 indicates generally a vibration unit shown supported by the upright blade 3 of a cable plow assembly indicated generally at 2.

The cable plow assembly includes a generally U-shaped blade holder 4 within which is positionably carried the blade 3 by means of a transversely extending pin means 5. The blade in turn hingedly carries in a trailing manner at 7 a tubular guide 6 for downwardly directing and depositing the conduit material in the kerf formed. The cable plow assembly thus far described and indicated generally at 2 can be considered conventional.

The blade holder 4 supports along its forward edge a box-like housing 8 which comprises part of a resilient mounting means, later described in detail, for the cable plow assembly.

An elongated member or beam 9 imparts the vehicle's forward motion to the cable plow assembly 2 by means of a normally vertical pivot pin 10 which extends through spaced apart ears 9A of the beam and through the forward ends of top and bottom hinge plate member 11 associated with the resilient mounting means. From this arrangement it will be apparent that the hinge plates and ultimately the cable plow assembly may swing in a substantially horizontal plane about the axis of the pin 10.

Indicated at 12 is a fragment of the chassis of the prime mover vehicle. The vehicle may be of the type shown and described in my U.S. Pat. No. 3,307,363 issued Mar. 7, 1967 and entitled Cable Laying Machine. The elongated member 9 is universally attached as at 13 to the side of the chassis 12 permitting the following described powered movement of the beam 9 about three separate axes. Double acting hydraulic cylinders are indicated at 14, 15 and 16, each universally coupled at both of their ends to the elongated member 9 and the chassis as more fully described in the above noted patent. For present purposes it is sufficient to note that the cylinder 14 operates to swing the beam 9 laterally at selected distances from the vehicle's longitudinal centerline while cylinder 15 serves to rotate the beam 9 about its major axis for varying the transverse angular relationship of the cable plow blade 2 to the ground surface. Hydraulic cylinder 16, the upper end of which is universally supported by a pair of upright plates 17, is operable to vary the height of the beam 9 above the surface of the ground for operatively locating the cable plow's blade at a selected cable laying depth. The advantages of the foregoing beam and cylinder arrangement in association with a cable plow assembly are several and essentially concern increased plow maneuverability over conventionally mounted cable plows which are in rearward trailing attachment to a prime mover.

The foregoing description of the beam 9 and its associated hydraulic cylinders is set forth merely to describe a preferred environment for the present invention and no limitation or restriction of the invention for use therewith is intended.

The vibratory unit 1, as best shown in FIGS. 2 and 3, is transversely orientated to the upright blade member 2 of the plow and mounted by means of a base plate 20 in overlying securement to a corresponding horizontal plate 21, the latter centrally secured to the cable plow blade 3 and braced by gussets 22 welded to the underside of the plate and the upper portion of the blade. In welded securement upon the base plate 20 are a pair of horizontally spaced apart mounting plates 23 having aligned openings 23A within which is secured the ends of a cylindrical raceway 24. Circular end plates 25-26 close the ends of raceway 24 and are each suitably secured to a mounting plate 23 as by peripherally located cap screws 27 incorporating a self-locking feature with each end plate preferably shouldered for insetting within the ends of raceway 24. Each end plate houses the outer races 28 of a double row ball bearing whose inner races 29 receive the somewhat reduced end portions 30A of a drive shaft 30.

For rotation with drive shaft 30 are a pair of bearing plates 31 keyed thereto as at 32 to the reduced portions 30A of the drive shaft. The right hand end of the drive shaft as viewed in FIG. 2 may be threaded to receive a nut element 33 while the left hand end of the drive shaft terminates in keyed engagement with a sleeve coupling 34. The shaft is prevented from axial displacement by the aforementioned nut element 33 and spacers 35 located intermediate the inner races 29 and bearing plates 31.

Journalled within the outer ends of bearing plates 31 is an orbiting member shown in the form of an inertia roller 38 shown resting at bottom dead center and having reduced ends for journalled reception within aligned openings 31A in each of the bearing plates. The inertia roller 38 is thereby positioned for rolling contact against the interior wall of the cylindrical raceway 24 in an orbital path around the longitudinal axis of drive shaft 30. Depending on the use to which the present vibratory unit is put to, the dimensions thereof will vary. For dissipation of heat resulting from the roller's forceful frictional contact against the raceway a water jacket 39 is provided welded along its ends to the mounting plates 23 and to the base plate 20. Inlet and outlet fittings 40-41 for the water jacket are internally threaded to receive suitable fluid couplings connecting conduits 42-43 with the interior of the jacket to circulate a cooling liquid about the exterior of the raceway 24. The water jacket has a non-constant sectional area, as can be seen in FIG. 3.

A motor adapter housing 45 is secured in bolted attachment to the end plate 25 and supports at its opposite end, within an annular shouldered area 45A, a motor mount 46 for a hydraulic powered motor 47. The motor's output shaft, indicated as at 48, extends into the sleeve coupling 34 for keyed engagement therewith. Hydraulic conduits at 49-50 provide for the supply and return of pressurized fluid from a source (not shown) carried by the prime mover and preferably a positive displacement pump driven by an auxiliary internal combustion engine. From the foregoing construction described it will be seen that upon energization of the motor 47 the drive shaft will be rotated to impart orbital motion to inertia roller 38 through the bearing plates 31. That portion of roller 38 intermediate the plates 31 will be in rolling contact with the interior of the raceway 24 thereby imparting forces having both horizontal and vertically orientated vectors to the raceway and hence the mounting plates 23 and ultimately inducing in the cable plow blade 3 an orbital motion for any given point thereon. The orbital path of amplitude of said given point will vary with the orbiting speed of the roller and the resistance presented by the ground to blade passage.

By way of example only, construction of such a vibratory unit with the inside diameter of the raceway 24 being of seven inches and a raceway length of twelve inches has proven very satisfactory. A quantity of lubricating oil is provided within the raceway upon assembly.

Coincidental with the orbital motion induced in the blade and occurring in a plane containing the blade's major axis, is a transversely directed vibratory motion acting in a second plane at right angles to the first mentioned plane. The transverse motion is particularly desirable, aside from lessening ground resistance to blade passage, for the production of finely granulated earthen particles known as fines which gravitate downwardly to form a bed into which the cable material is deposited. While shown and described in conjunction with a cable plow assembly it is believed obvious that additional applications of such a unit to other material working instrumentalities will be readily apparent to those skilled in the art.

The blade 3 and blade holder 4 of the cable plow assembly are conveniently adapted for such vibratory movement by reason of the resilient mounting means of which the housing 8 comprises a portion as aforesaid. Conversely, but of equal importance, the prime mover machine is insulated from a substantial amount of such motion. The resilient mounting means, as best shown in FIGS. 1 and 5, includes vertically spaced rubber blocks indicated at 51, 52 and 53 which are confined within the rectangular housing 8. The rubber blocks are of a cross sectional area to occupy housing 8 and are adapted to be biased in desired degrees of compression therewithin as hereinafter described. A draft pin indicated at 54 extends through aligned openings in the blocks and intermediate the top and bottom hinge plates 11 and terminates below the housing 8 to receive at its threaded end a compression plate 55 and compression nut 56. The upper end of draft pin 54 is welded to the top hinge plate 11 while being secured as by keying to the bottom hinge plate to prevent relative rotational movement. Both hinge plates 11 are isolated from contact with the housing 8 by the rubber blocks 51-53 to thereby isolate the beam 9 and chassis 12 of the supporting vehicle from a substantial amount of vibratory motion of the cable plow assembly. This is accomplished by the foregoing described resilient mounting means while still maintaining the cable plow blade element 3 in parallel, trailing relationship with the pivot pin 10. Forward motion is exerted on cable plow assembly through the hinge plates 11, draft pin 54, rubber blocks 51-53, housing 8 and ultimately to the blade holder 4. It will be understood that the rubber blocks are all compressed to some degree in the assembly of the resilient mounting means and may be adjusted by advancement of the nut element 56 in varying degrees as necessary. An apertured plate 57 is secured within the housing 8 and serves to position the lower and upper ends of the rubber blocks 51 and 52. The third rubber block 53 is upwardly biased against the lower hinge plate 11 by the nut 56 acting on the compression plate 55.

From the above description of the resilient mounting means it is believed apparent that the cable plow assembly is resiliently mounted for vibratory movement with a random point on the blade moving in an elliptical path. During such movement the housing 8 is prevented by the blocks 51–53 from contact with either the hinge plates 11 or with the draft pin 54. In a typical cable laying operation the cable plow assembly and the resilient mounting means carried thereby will swing to a trail position about the upright axis of pivot pin 10 into parallel, offset relationship to the centerline of the vehicle chassis 11. Operation of the hydraulic cylinders 13, 14 and 15 during vehicle travel will respectively swing the beam 9 outwardly from the vehicle centerline, tilt the beam and vertically position the same for alternating the path of the cable plow assembly as may be necessary to avoid obstacles.

While I have shown but one embodiment of the present invention it will be understood that changes and modification thereto will be readily apparent to others skilled in the art with such coming within the present invention:

I claim:

A liquid cooled vibratory unit for imparting vibratory motion to an upright earth penetrating blade, said unit comprising:

a cylindrical raceway having a horizontal major axis,
  mounting plates for said raceway having openings therein receiving of the ends of the raceway,
  a base plate supporting said mounting plates and adapted to be perpendicularly disposed to the major axis of the earth penetrating blade,
  end plates carried by said mounting plates closing the ends of said raceway with said end plates having aligned bearing receiving openings therein,
  an elongate inertia roller for rolling contact with a major portion of the internal surface of the raceway.
  a drive shaft for the roller with said shaft journalled in bearings within said end plates and provided with bearing plates for imparting orbital motion to said roller,
  a hydraulically powered motor and adapter housing therefor laterally supported by one of said end plates with the output shaft of said motor in axial alignment with and coupled to said drive shaft, and
  a cooling jacket, for said raceway coextensive in length therewith and secured in place on said mounting plates to provide a fluid receiving area about said raceway and including fluid inlet and outlet means to receive conduits for the positive application of transient cooling fluid to substantially all of the exterior cylindrical surface of said raceway.

2. The liquid cooled vibrator unit as claimed in claim 1 wherein said jacket is of a configuration to provide a non-constant sectional area about said raceway within which the cooling fluid is circulated with said inlet means being located on said jacket to discharge cooling liquid tangentially toward said raceway.

3. The liquid cooled vibrator unit as claimed in claim 1 wherein the cooling jacket includes planar portions terminating downwardly in attachment to said base plate with said inlet means being located in one of said planar portions.

References Cited

UNITED STATES PATENTS

| 1,733,373 | 10/1929 | Jubien et al. | 74—87 |
|---|---|---|---|
| 3,236,112 | 2/1966 | Baugh | 74—87 |
| 3,266,739 | 8/1966 | McKibben | 74—87 X |
| 3,393,571 | 7/1968 | Matson | 74—87 |

MILTON KAUFMAN, Primary Examiner

U.S. Cl. X.R.

173—49